US010769200B1

(12) United States Patent
Lin

(10) Patent No.: US 10,769,200 B1
(45) Date of Patent: Sep. 8, 2020

(54) RESULT RE-RANKING FOR OBJECT RECOGNITION

(71) Applicant: A9.com, Inc., Palo Alto, CA (US)

(72) Inventor: Xiaofan Lin, Palo Alto, CA (US)

(73) Assignee: A9.COM, INC., Palo Alto, CA (US)

( * ) Notice: Subject to any disclaimer, the term of this patent is extended or adjusted under 35 U.S.C. 154(b) by 622 days.

(21) Appl. No.: 14/789,443

(22) Filed: Jul. 1, 2015

(51) Int. Cl.
*G06K 9/00* (2006.01)
*G06F 16/248* (2019.01)
*G06F 16/2455* (2019.01)
*G06F 16/583* (2019.01)
*G06F 16/242* (2019.01)

(52) U.S. Cl.
CPC ........ *G06F 16/5846* (2019.01); *G06F 16/248* (2019.01); *G06F 16/2425* (2019.01); *G06F 16/2455* (2019.01); *G06K 9/00456* (2013.01)

(58) Field of Classification Search
USPC .......................................................... 707/728
See application file for complete search history.

(56) References Cited

U.S. PATENT DOCUMENTS

| | | | | |
|---|---|---|---|---|
| 5,598,557 A * | 1/1997 | Doner | ............... | G06F 17/30687 |
| 9,305,226 B1 * | 4/2016 | Yuan | ...................... | G06K 9/723 |
| 9,934,526 B1 * | 4/2018 | Dhua | .................. | G06Q 30/0623 |
| 2004/0143600 A1 * | 7/2004 | Musgrove | ......... | G06F 17/30864 |
| 2006/0195440 A1 * | 8/2006 | Burges | ............. | G06F 17/30702 |
| 2006/0251339 A1 * | 11/2006 | Gokturk | ............. | G06K 9/00375 |
| | | | | 382/305 |
| 2008/0082497 A1 * | 4/2008 | Leblang | .................. | G06F 16/58 |
| 2009/0248667 A1 * | 10/2009 | Zheng | ............... | G06F 17/30702 |
| 2011/0125735 A1 * | 5/2011 | Petrou | ............... | G06F 17/30256 |
| | | | | 707/723 |
| 2011/0267490 A1 * | 11/2011 | Goktekin | ........... | H04N 1/00307 |
| | | | | 348/222.1 |
| 2014/0355835 A1 * | 12/2014 | Rodriguez-Serrano | ...................... | |
| | | | | G06K 9/72 |
| | | | | 382/105 |
| 2015/0278224 A1 * | 10/2015 | Jaber | ................. | G06F 17/30259 |
| | | | | 707/749 |
| 2016/0196350 A1 * | 7/2016 | Mau | ......................... | G06T 3/40 |
| | | | | 707/706 |
| 2016/0292505 A1 * | 10/2016 | Agrawal | ............ | G06K 9/00469 |

* cited by examiner

*Primary Examiner* — Tamara T Kyle
*Assistant Examiner* — Raheem Hoffler
(74) *Attorney, Agent, or Firm* — Hogan Lovells US LLP

(57) ABSTRACT

A user can capture an image of a text object of interest and have that image submitted for processing. The image can be pre-processed to improve quality and then submitted to an optical character recognition process to identify the words, characters, or strings in the image. At least some of these results can be submitted as a query to a search engine to obtain potential matches. In order to improve the accuracy of the results, information such as the titles for the results can be compared against each recognized word, character, or string from the image, including the ordering of those elements. An updated relevancy score can then be generated based on the full, ordered set. The recognized text is also analyzed to attempt to recognize model numbers or other identifiers that can be weighted more heavily as being indicative of accurate matches. Matches are selected from the re-ranked results.

20 Claims, 12 Drawing Sheets

FIG. 3

Brand X
Mint Tea

Mint herb tea is a natural beverage. It contains no artificial coloring or preservatives and it has caffeine. We have personally selected all the herbs chosen for this blend and they are of only the finest quality When you serve Mint Tea, you are serving your customers the very best.

*FIG. 7*

| Query word | Database word | Standard Levenshtein edit distance | OCR-based Levenshtein edit distance |
|---|---|---|---|
| CO50BK | CØ5ØBK | 1 | 0.3 |
| Canon | canon | 1 | 0.4 |
| Ooctor | Doctor | 1 | 0.5 |

*FIG. 8A*

Standard confusion matrix

|   | 0 | 1 | 2 | ... | a | b | c | ... | A | B | C | ... | # | $ |
|---|---|---|---|---|---|---|---|---|---|---|---|---|---|---|
| 0 | 0 | 1 | 1 | 1 | 1 | 1 | 1 | 1 | 1 | 1 | 1 | 1 | 1 | 1 |
| 1 | 1 | 0 | 1 | 1 | 1 | 1 | 1 | 1 | 1 | 1 | 1 | 1 | 1 | 1 |
| 2 | 1 | 1 | 0 | 1 | 1 | 1 | 1 | 1 | 1 | 1 | 1 | 1 | 1 | 1 |
| ... | 1 | 1 | 1 | 0 | 1 | 1 | 1 | 1 | 1 | 1 | 1 | 1 | 1 | 1 |
| a | 1 | 1 | 1 | 1 | 0 | 1 | 1 | 1 | 1 | 1 | 1 | 1 | 1 | 1 |
| b | 1 | 1 | 1 | 1 | 1 | 0 | 1 | 1 | 1 | 1 | 1 | 1 | 1 | 1 |
| c | 1 | 1 | 1 | 1 | 1 | 1 | 0 | 1 | 1 | 1 | 1 | 1 | 1 | 1 |
| ... | 1 | 1 | 1 | 1 | 1 | 1 | 1 | 0 | 1 | 1 | 1 | 1 | 1 | 1 |
| A | 1 | 1 | 1 | 1 | 1 | 1 | 1 | 1 | 0 | 1 | 1 | 1 | 1 | 1 |
| B | 1 | 1 | 1 | 1 | 1 | 1 | 1 | 1 | 1 | 0 | 1 | 1 | 1 | 1 |
| C | 1 | 1 | 1 | 1 | 1 | 1 | 1 | 1 | 1 | 1 | 0 | 1 | 1 | 1 |
| ... | 1 | 1 | 1 | 1 | 1 | 1 | 1 | 1 | 1 | 1 | 1 | 0 | 1 | 1 |
| # | 1 | 1 | 1 | 1 | 1 | 1 | 1 | 1 | 1 | 1 | 1 | 1 | 0 | 1 |
| $ | 1 | 1 | 1 | 1 | 1 | 1 | 1 | 1 | 1 | 1 | 1 | 1 | 1 | 0 |

Source characters / Destination characters — 802

FIG. 8B

OCR-error generalized confusion matrix

| Source character | Destination character | Distance |
|---|---|---|
| a | a | 0 |
| c | b | 1 |
| 0 | O | 0.3 |
| 1 | l | 0.3 |
| k | K | 0.4 |
| p | p | 0.4 |
| 6 | b | 0.5 |
| 5 | S | 0.5 |
| R | p | 0.6 |
| o | a | 0.6 |

FIG. 8C

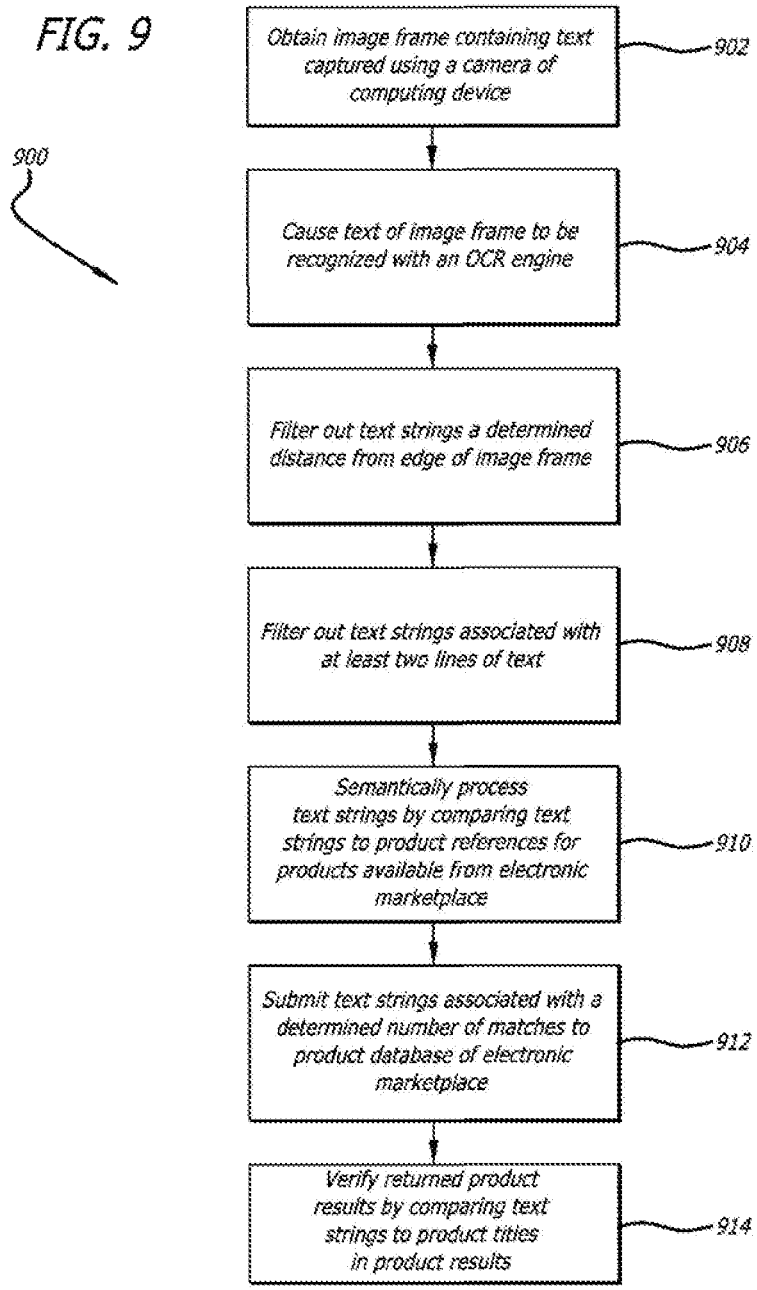

RESULT RE-RANKING FOR OBJECT RECOGNITION

BACKGROUND

As people are increasingly utilizing a variety of computing devices, including portable devices such as tablet computers and smart phones, it can be advantageous to adapt the ways in which people interact with these devices. Users are accustomed to manually inputting phone numbers to make a phone call, manually typing a web address into a web browser to view a web page, manually typing desired terms for a search, and the like. These tasks are often tedious and time consuming. Various methods to save users time have been offered on various devices such as assigning a phone number to a favorites list, bookmarking a Web address, creating a wish list associated with an electronic marketplace. Augmented reality (AR) and visual search applications that display a live view of a physical real-world environment augmented by computer-generated sensory input, have become more popular with adoption of smartphones and other portable computing devices. Through computer vision algorithms, some of these applications are able to provide users with information related to their environment, enabling users to interact with aspects of the environment that were previously unavailable. As technology evolves and as the features and services offered on portable computing devices evolve and expand, the ways shortcuts and other time saving methods are provided to users is changing.

BRIEF DESCRIPTION OF THE DRAWINGS

Various embodiments in accordance with the present disclosure will be described with reference to the drawings, in which:

FIG. 3 illustrates another example set of search results displayed on a computing device in accordance with at least one embodiment;

FIG. 7 illustrates another example input image frame captured by a computing device in accordance with at least one embodiment;

FIGS. 8A, 8B, and 8C illustrates another example input image frame captured by a computing device in accordance with at least one embodiment;

FIG. 9 illustrates an example process of analyzing text of an image frame for in order to perform a search that can be used in accordance with at least one embodiment;

DETAILED DESCRIPTION

Figure 1:
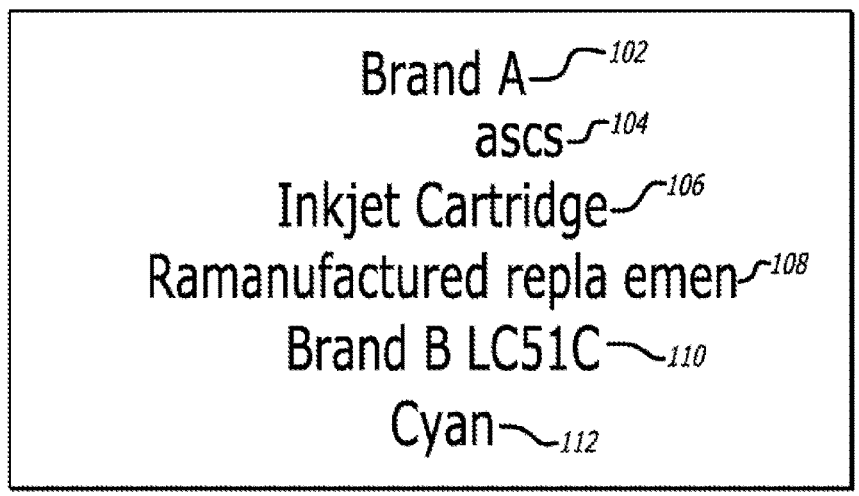
FIG. 1 illustrates an example input image frame captured by a computing device in accordance with at least one embodiment.

Systems and methods in accordance with various embodiments of the present disclosure may overcome one or more of the foregoing or other deficiencies experienced in conventional approaches to providing users with information via a computing device. In particular, various embodiments enable a device, such as a portable computing device, to perform tasks such as processing an acquired image to recognize text in the image to identify a product (or related products) associated with the text. For example, an image frame including text can be analyzed using an optical character recognition (OCR) engine and methods, in accordance with various embodiments, can automatically attempt to select the most relevant words associated with products available for purchase from an electronic marketplace. These words can then be used to generate a search query that is sent to a search engine to obtain a set of search results, such as may be associated with an electronic marketplace to return information for relevant products. In various embodiments, the search results returned from a search engine go through a relevance ranking process in order to determine the results that are most relevant to the text identified from the image. In at least some embodiments, all of the identified text is compared against the titles (or other such portion) of the various search results in order to identify situations where only a small percentage of the identified text actually matches a given search result. The ordering of the words recognized from the image can also be taken into account in order to rank results more highly that contain the identified words in the same order. Further, the process can attempt to identify words that are indicative of product codes or model numbers, such as may consist of strings of capital letters, numbers, dashes, and other such characters and patterns. These uncommon words that match model number patterns can be weighted or scored more heavily in order to cause these uncommon words to affect the result ranking more than common words that might be found for various types of results. The model number search can also be expanded beyond those located in a fixed search dictionary, as pattern-based detection allows for recovering additional model numbers that might have been missed by the model number dictionary.

In at least one embodiment, image information associated with a "live" field of view of a camera can be displayed on a portable computing device. The image information can be analyzed to attempt to recognize text in the live field of view and, in response to recognizing the text as being associated with a product available for purchase from an electronic marketplace, for example, product listings associated with the product can be determined and displayed to a user. Various other types of results can be returned as well as known for such purposes. Upon receiving, from the user, a touch (or other) selection to a product listing, additional information for the associated product can be displayed, enabling the user to learn more about and/or purchase the product from the electronic marketplace through the portable computing device, among other such options.

Various other functions and advantages are described and suggested below as may be provided in accordance with the various embodiments.

FIG. 1 illustrates frame 100 that can be sent to a product search server for product lookup in accordance with various embodiments. In this example, frame 100 is an image of a product description for a replacement inkjet cartridge from Brand A for a Brand B printer. In this example, frame 100 is obtained post OCR or after text detection and binarization on a client computing device, such as a smartphone, tablet computer, and the like. The text detection and binarization could also be performed remotely after being sent to a server. Accordingly, there is a lot of text associated with frame 100 and not all of it was recognized in the OCR process. For example, "ascs" 104 is actually "basics," and "Remanufactured repla emen" 108 is actually "Remanufactured replacement" on the product description. Accordingly, "Brand A" 102, "Inkjet Cartridge" 106, "Brand B LC51C" 110, and Color "Cyan" 112 have been properly recognized in this example.

Figure 2:
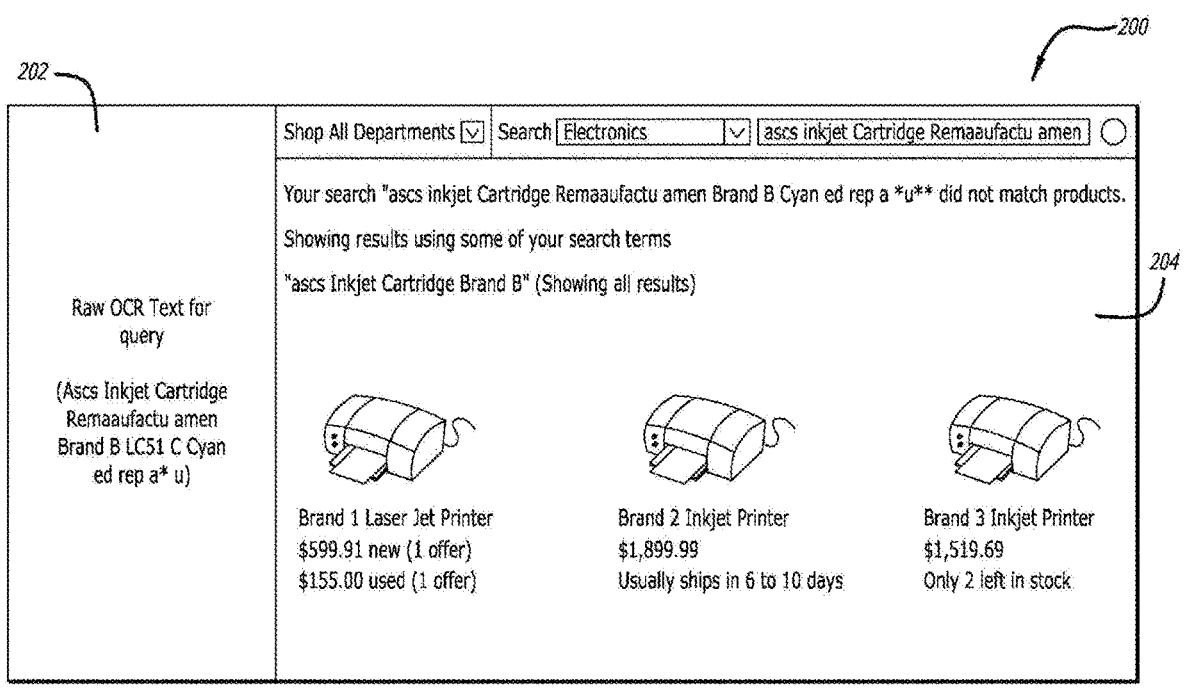
FIG. 2 illustrates example set of search results displayed on a computing device in accordance with at least one embodiment.

FIG. 2 illustrates an example results page 200 containing search results 204 returned from submitting the text strings from frame 100 without any preprocessing or error checking. In this example, column 202 shows the text strings that were submitted to a search engine to obtain search results 204. If all these words are sent to a search engine, either no results will be returned or it is more likely that incorrect results will be. In this example, the search engine tries to drop some of the search terms to formulate a shorter more coherent query but that does not produce relevant results. Accordingly, "ascs," "Inkjet Cartridge," "Remanufactured repla emen," and "Brand B LC51C" were submitted to the search engine and three inkjet printers were returned as search results 204. Search results 204 are not, however, relevant to the user that captured the original image associated with frame 100 since they were trying to recognize text associated with an inkjet cartridge replacement and, thereby, be presented with product results for the same. Accordingly, a method to isolate or identify the most relevant words for a product search from an input frame, such as frame 100, is therefore desirable. In order to achieve this end, information from both the input image frame, such as the size, position of text, etc.) is used, as well as semantic knowledge of the recognized words. Further, another goal is to avoid false positives when a user is pointing their computing device at products or at other printed text that includes text associated with phone numbers, the interior content of books or magazines, and the like.

Given a frame of text, such as frame 100 from FIG. 1 and its respective search results from FIG. 2, a number or heuristic test that can be applied to the recognized text in an attempt to isolate or identify the most relevant words in the same to send to a product search server. Some of these steps are filtering steps that filter out words that are determined to be irrelevant. Some other steps are scoring steps that re-order the priorities of different words. Additionally, some of these steps involve OCR-based spelling correction. Finally some steps infer semantic information from the collection of words and decide what words would be relevant for product search.

Figure 5A:
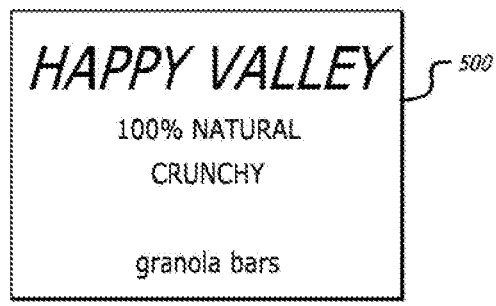
FIGS. 5A and 5B illustrate another example input image frame captured by a computing device in accordance with at least one embodiment.
Figure 5B:
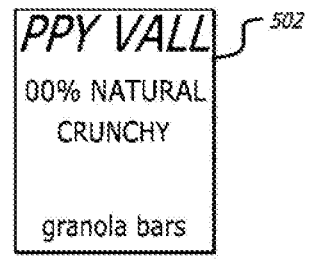

FIG. 5A illustrates an example product 500 for "Happy Valley" granola bars that a user may be interested in either learning more about or is interested in purchasing more of from the electronic marketplace through their computing device. In this example, however, the user was unable to fit all of the text in the image fame and the text of product 500 was, thereby, partially cropped to produce cropped frame 502, as shown in FIG. 5B. In this example, the text strings "URE" and "VALL" of cropped frame 502 are close to the frame boundaries which are cropped from "NATURE" and "VALLEY". In at least one embodiment, words that are close to the image boundaries or within a determined distance of an edge of the image or frame can be ignored. Words or text strings in a given frame, however, can be of different heights and, in order to make this rule more accurate, the distance that a text string is from an edge of the image can be expressed as a percentage of the height of the text string and a threshold can be applied to this percentage. In this example, since the text strings "NATURE" and "VALLEY" are so close to the edge of the cropped frame 502 that a portion of their text has been cropped out of the image, the cropped text strings "URE" and "VALL" will be omitted in this example.

Since large volumes of text tend to be either product descriptions or material from, for example, the inside a book or magazine, such text is usually often irrelevant or misleading for the purposes of product searching. Accordingly, a word and line count filter can be applied when a first number of text lines (e.g., >2) are identified. In this example, an associated confidence score of each word of text string could be adjusted downward. In one example, when a second greater number of lines of text (e.g., >5) is identified, all words or text strings associated with these lines can be ignored. All the remaining text strings, either singular or from smaller text lines, are retained for further processing.

Figure 6:
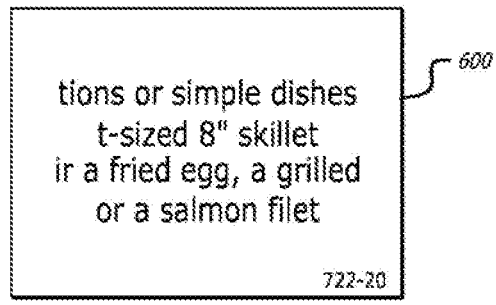
FIG. 6 illustrates another example input image frame captured by a computing device in accordance with at least one embodiment.

For example, FIG. 6 shows frame 600 that includes part of a product description for a skillet. In this example, the product description includes words that are relevant to a skillet, but also includes words, such as salmon and dishes, and fried egg, that could be misleading. Accordingly, since fame 600 includes four lines of text, a respective confidence score for each word or text string in these lines could be reduced or the entire block of text could be ignored. In this example, however, there is also a product number by itself, away from the description. Accordingly, the model number will be isolated or pass this filtering step.

In at least one embodiment, text strings that passed the previous steps can now be scored. For example, if a line of text contains a stop word, such as an, the, and, has, but etc., each text string in such a text line could be scored lower or their respective confidence score could be adjusted downward. Thus, the notion of stop words in this context may be considered similar to stop words used for text search. Additionally, classes of common words that are not relevant for product search can also be added to a stop word list for purposes of this step. For example, words such as road, street, way, and the like, which are usually present in addresses, but are not typically relevant to products could be added to such a list. Further, words such as days of the week and months of the year could also be since they too are not typically relevant to product search. The intuition behind this step is that a line of text that contains a stop word is probably a line of descriptive text, which will likely contain relevant words; however, these same words could be misleading for also being suggestive of other products. Further, such descriptive text will inevitably contain irrelevant text as well. In at least one embodiment, this rule is used to change the priority of words in a relative ranking among each other and may not remove words from the list of words being analyzed. FIG. 6 is also relevant to stop word based prioritization. For example, the product description in frame 600 includes a number of stop words, such as "a" and "or." Accordingly, the relative ranking of all the text strings in frame 600 would go down relative to the model number.

As part of the OCR process, each word recognized word is given a score by the OCR engine. This OCR score is proportional to the confidence that the OCR engine has that a particular word was correctly recognized. In at least one embodiment, the remaining words at this stage can be further reordered according to this confidence score. Accordingly, the word or text string with the highest score will keep its current score and the score of all other words can be reduced by a factor proportional to the difference between a particular word's score and the highest score.

In at least one embodiment, the word or text string priorities are further reordered as a function of text height or font size. For example, the larger the text or font size is in a frame, the assumption is that it is more important relative to smaller text. FIG. 7 illustrates an example image frame that was captured of a box of mint tea from Brand X. For example, the words Mint Tea and Brand X at the top of the frame would receive either a score adjustment or the priority ranking of each of the words could be readjusted where the larger text is given a ranking boost upward.

In at least one embodiment, the text strings ranking or score can also be adjusted using a distance from image center based word prioritization. For example, when users scan a particular word or item, they tend to try to center the word or item in the view finder of the image capture application. Accordingly, words or text strings can be reprioritized based on their distance from the center of the image frame. That is, the word closest to the center may keep its current score and all other words are rescored based on their distance from the center. For example, the farther away from the center a word is located, the more its score is reduced.

In at least one embodiment, words, text strings, or phrases can classified into semantically relevant categories for product search, such as brand names, model numbers, and noun phrases related to products. First, a list of noun phrases of items sold by, for example, an electronic marketplace is created. Examples of noun phrases can include laptop, wireless router, inkjet cartridge, and the like. Similarly, a list of Brand names and Model numbers (e.g., CRC-400, LC51C etc.) that are part of a product catalog associated with the electronic marketplace are also created.

Since data from the electronic marketplace is not always clean, a cleanup process can be applied while creating these lists. For example, if the noun list is created first, the noun list can be scrubbed against the stop words list. Accordingly, when creating the brands list, words that are already listed as stop words or noun phrases can be removed from the brands list. Similarly all words that were classified as noun phrases or brands are excluded from the list of model numbers.

The words obtained from the query image frame that remain after the previous step (word distance from image center) can then matched against these lists of noun phrases, brands and model numbers. The words that match any of these lists can then be classified as nouns, brands and model numbers respectively. In order to perform this comparison, the words obtained from the query image are grouped into phrases of different lengths to compare against the list of noun phrases, brands and model numbers. In at least one embodiment, longer phrase matches are preferred to shorter phrase or word matches. For example, the single phrase "wireless router" is a better match than the two words "wireless" and "router" separately.

The OCR engines are not perfect and are known to make certain kinds of recognition errors. For example, it is common for an OCR engine to mix up 0's (zeros) and O's (the letter O) or 1's and l's. Other less common errors include confusing the letters Z and 2 or D and O. Accordingly, approximate matches are accepted while matching the list of remaining words against the noun phrase, brand, and model number lists. The words are then compared against the approximate matches and the matches are scored based on a Levenshtein distance that has been generalized to take OCR errors into account. The matches that are within a certain value of this generalized edit distance are considered matches and the word from the list is taken as the corrected version. In one example, the edit distance threshold used can also depend on the length of the word being matched.

FIG. 8A shows table 800 which illustrates a few examples utilizing the edit distance. In this example, there is a column for the database word, a column for the query word that was captured by the user, a column for the standard edit distance, and a column for the OCR-based edit distance. In each of these examples, a single character of the query word is off. In this example, the generalized OCR distance can be specified taking standard confusion matrix 802, shown in FIG. 8B, between all characters and reducing the edit distance between certain pairs of characters (e.g., between 0 and O's). The standard confusion matrix 802 for edit distance has a value of 1 when the source character and destination character are different and a value of 0 when the source character and destination character are the same.

The standard confusion matrix 802 can be modified for certain source and destination characters as shown in OCE-Error Confusion Matrix 804 shown in FIG. 8C. In this example, the first two rows are just copied from the standard confusion matrix 802 for illustration purposes. The remaining rows are examples of how the edit distance can be modified for similar looking characters.

In at least one embodiment, a query is issued to the product database when a noun phrase and a brand name are found or if an alpha-numeric model number has been found. Further, while composing the query for product search, up to two noun phrases, two model numbers and a brand could be used. The selection of the top ranking words is based on the scoring explained above. In at least one embodiment, if the system decides not to submit a query, then the nouns, brands and model numbers can be sent back to the computing device and the user can select among those words to formulate a custom query.

Figure 3:
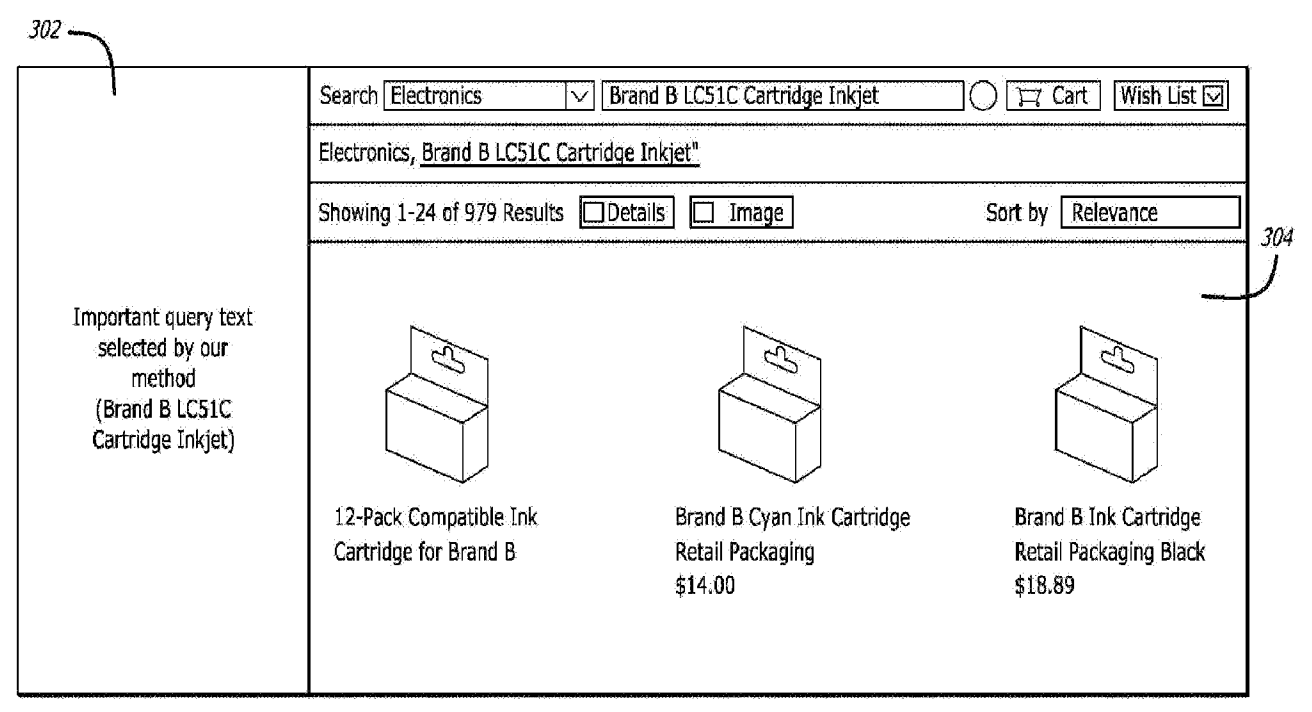

Accordingly, FIG. 3 illustrates an example results page 300 containing search results 304 returned from submitting the text strings from frame 100 after they have been filtered and scored using the steps described above. Accordingly, in this example, the query results all include inkjet cartridge replacements which are much more relevant to the user's desire to learn more about and be presented with the same, as opposed to search results 204 from FIG. 2. In this example, column 302 lists the query terms that were used to return these results are much more relevant to inkjet cartridge replacements and focused on the same compared to those query terms used in column 202 of FIG. 2. In at least one embodiment, these search results obtained from the above step can then be validated against the query. In at least one embodiment, the number of search query terms included in the product title of a particular returned search result can be counted. A result is considered valid if a certain number or percentage of the query terms is present in the product title of the search result.

Figure 4:
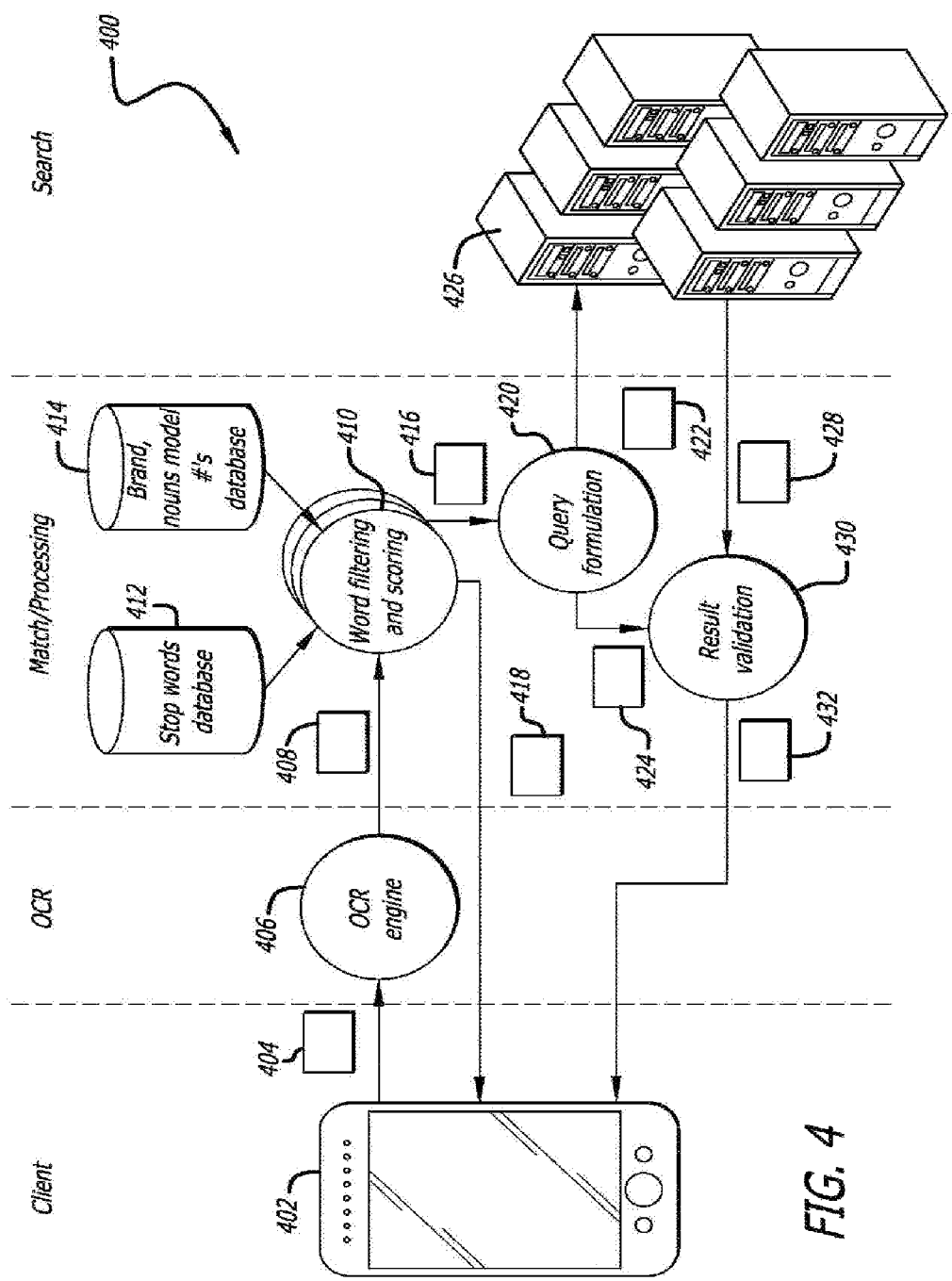
FIG. 4 illustrates an example data flow through a system in accordance with at least one embodiment.

FIG. 4 illustrates an example data flow 400 though the query text selection and product search system, in accordance with various embodiments. In this example, a binary mask of input image 404 containing text is sent from computing device 402 to OCR engine 406. From OCR engine 406, candidate text strings and their respective location 408 within the input image 404 are sent to word filtering and scoring module 410. In this example, word filtering and scoring module 410 utilizes data stored in stop words database 412 and brand names, nouns, and model number database 414. From word filtering and scoring module 410, selected brands, nouns, and model numbers 416 are sent to query formulation module 420 which formulates search query 422 and sends the same to search database 426 and also sends copy search query 424 to results validation module. At this point, search database 426 sends search results 428 to be compared to copy search query 424 to validate the same. After search results 428 are validated, validated search results 432 are sent for presentation to a user on computing device 402. Further, before query formulation, brands, nouns, and model numbers 418 can also be sent to computing device 402.

FIG. 9 illustrates an example process 900 for analyzing an image frame that includes text to identify the most relevant words for a product search that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an image frame containing text captured using a camera of computing device is obtained 902. In this example, text of image frame is recognized with an OCR engine 904. In this example, text strings a determined distance from edge of image frame can be removed from query term consideration 906. Further, text strings associated with at least two lines of text can also be removed from consideration 908. In this example, the text strings can then be semantically processed by comparing each text string to product references for products available from electronic marketplace 910 and text strings associated with a determined number of matches can be submitted to a product database of electronic marketplace 912. Accordingly, the product database will return product results associated with the text strings and these product results can be verified by comparing titles of each product to the text strings 914. The number of text strings that are also present in the title of the returned product can be counted and result can be considered valid if a certain percentage of the query terms are present in the title of a respective search result. Various other types of filters and scoring methods can be utilized and provided as well within the scope of the various embodiments.

In at least one embodiment, an image frame containing text captured using a camera of a computing device is obtained. The text within the image frame is subsequently recognized with an OCR engine where an output of the OCR engine includes recognized text strings and a score for each text string associated with a respective recognition confidence. Text strings from the output of the OCR engine that are at least one of a determined distance from an edge of the image frame or are associated with a determined number lines of text are removed or filtered out to generate a set of text strings to generate a set of filtered text strings. In this example, the determined distance from an edge of the image frame is a function of height of a respective text string. This set of filtered text strings is rank or prioritized according to the score for each text string and then compared to product references associated with products available for purchase from an electronic marketplace. A combined threshold number of matches or approximate matches to within an allowable deviation are identified between the ranked set of filtered text strings and product references and the ranked set of filtered text strings are submitted to a search engine associated with the electronic marketplace.

In one example, each of the set of filtered text strings is compared to a list of stop words that includes words unassociated with products available for purchase from the electronic marketplace. The score of each text string in a line of text strings is then adjusted downward when at least one of the text strings in the line is a stop word. The score of each text string can also be adjusted as a function of text size relative to other text strings where the score is adjusted upward for larger font sizes relative to smaller font sizes. Further, the score can be adjusted as a function of distance from a center of the image frame.

Figure 10A:
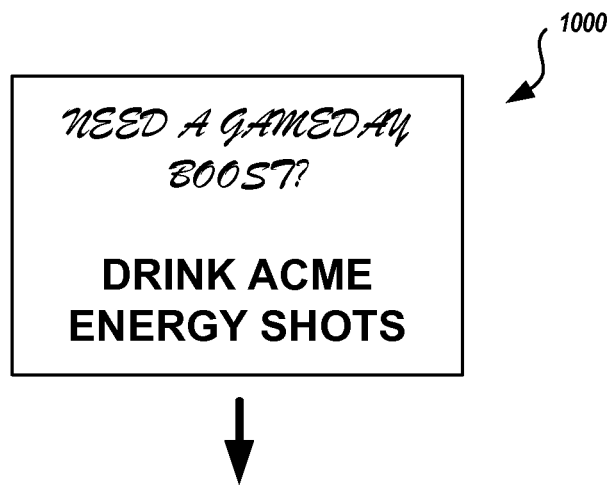
FIGS. 10A and 10B illustrate results that can be obtained in response to analyzing text of an image from in accordance with at least one embodiment.

It may be the case, however, that such approaches may still result in inaccurate identifications or false positives of objects or text in an image. For example, consider the image 1000 illustrated in FIG. 10A that could have been captured using a camera and analyzed using an OCR and search process such as those discussed above. In this example certain high priority words might be used to form a query to search for matching results. The query from this image might then include words such as "gameday," "drink," and "energy." From viewing the example it can be determined that the product being advertised is "ACME Energy Shots." By querying items using those terms, however, matching products can be identified such as the "SystemShock Energy Drink," which includes the terms "energy" and "drink" from the image. This result is not accurate, but could be returned as a match for the query. If all the recognized words (other than stop words, etc.) of the image had been utilized, the results may have been more accurate. Further, if the ordering of the words had been considered the results may have been more accurate, as the phrase "energy drink" in the search result includes those words in a different order than were in the image. Further still, a product identifier was located in the original image but may have either not been recognized or weighted more than any other word in the image. As a product identifier can be highly indicative of the correct result, it would be advantageous to factor such information more heavily in the ranking process.

Figure 10B:
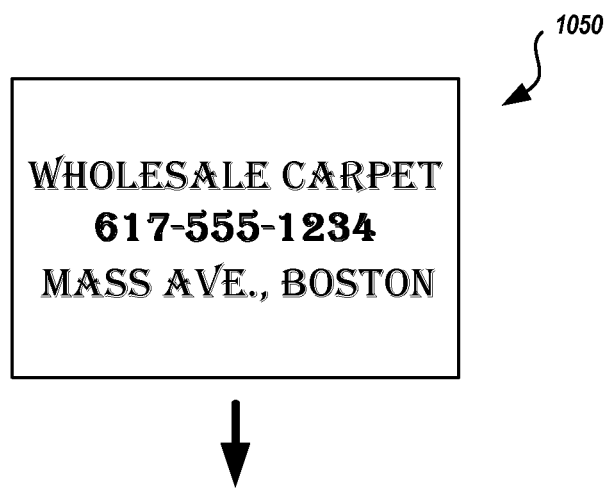

A similar result is illustrated in the situation 1050 of FIG. 10B. Here, the image includes information for a "wholesale carpet" company located in Boston. Because only certain words were used and the ordering not considered, the most likely match returned by the system corresponds to a set of "Boston Carpet Car Mats." As with the example above, if all the recognized words (and phone numbers) had been considered, as well as their order, the results returned could have been ranked more appropriately.

Accordingly, approaches in accordance with various embodiments attempt to overcome these and other deficiencies in existing object identification processes by considering information such as all recognized terms in an image, as well as the ordering of those terms. The recognition of uncommon words that match patterns of model numbers or product identifiers can also be weighted more heavily, as being indicative of a specific match result. The uncommon words considered can also expand beyond a known dictionary in order to match numbers or identifiers for new products or other objects that might not have the corresponding identifier in a known object matching dictionary. Various other factors can be used to rank and/or re-rank the relevance scores for various search results in accordance with various embodiments.

Figure 11:
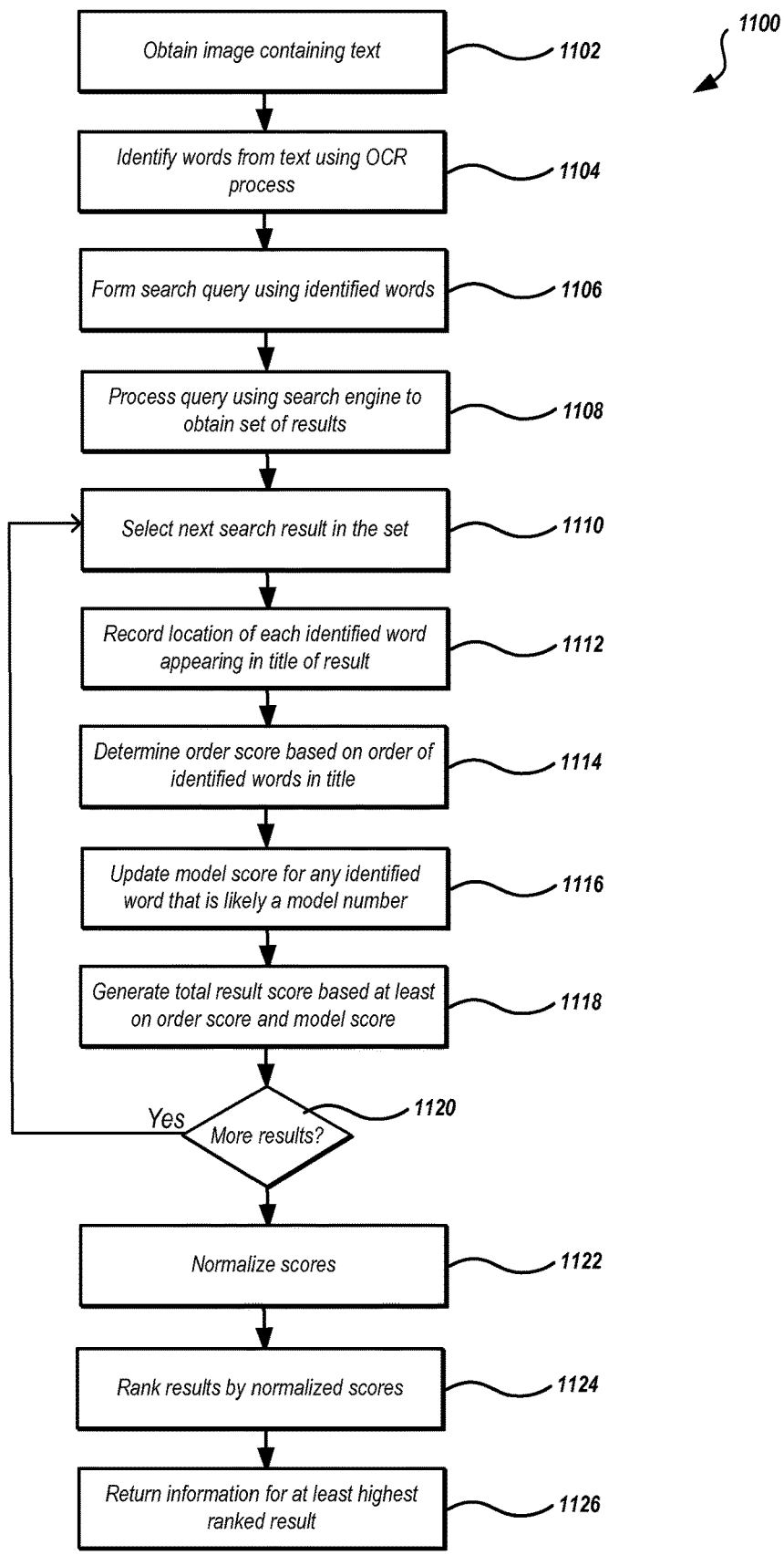
FIG. 11 illustrates an example process for re-ranking search results to provide more accurate results for a user that can be utilized in accordance with at least one embodiment.

FIG. 11 illustrates an example process 100 for ranking search results that can be utilized in accordance with various embodiments. An image containing text can be obtained 1102, such as by a user capturing the image using a camera of a computing device. As discussed, the image can be a single, digital still image or a frame of video content, among other such options. Any pre-processing of the image can be performed as discussed and suggested herein in order to attempt to improve the accuracy of the text recognition. Once the pre-processing is completed, a text recognition process such as OCR can be used to identify 1104 words, characters, and alphanumeric strings from the image. As mentioned, each word recognized from an example OCR process can have an associated confidence score, and only words with at least a minimum confidence score can be considered. Further, stop words and other such strings or characters can be eliminated from consideration as well using approaches discussed and suggested elsewhere herein.

Using the recognized words output from the OCR process, a search query can be generated 1106 for submission to a search engine. As discussed herein, certain of the words may be selected for the query based on those words being "important" words, as well as a desire to reduce the processing and time needed to obtain the results. In other embodiments all words recognized by the OCR process may be added to the query, among other such options. The query can then be submitted to a search engine, which can be located locally or remotely, as may require the query to be transmitted across at least one network. The query can then be processed 1108 by the search engine and a set of search results obtained.

In at least some embodiments, the search results can come with a ranking or scoring indicating an amount of relevance of each result to the submitted query. Approaches for generating relevancy scores are known in the art for such purposes, and further can include any approaches discussed or suggested herein. As mentioned, however, these relevancy scores may not take into account available information that can help to improve the accuracy of the results. Accordingly, approaches in accordance with various embodiments can attempt to update or improve the relevancy scores and perform a re-ranking in order to attempt to improve the accuracy of the search results.

One example ranking algorithm analyzes each of the search results (or at least a subset of the highest-ranked search results from the search engine) to attempt to update the relevancy score for that result. Starting with selecting 1110 a first result of the set of search results, the title or other such aspect of the search result can be compared against all the text recognized from the image. Using a subset of words with the search engine allows for a fast search, but then analyzing the results with the full set of words enables a more accurate relevance score to be calculated. In addition to considering all the recognized words, the relative ordering of those words can be considered as well. In this example the location of each identified word appearing in the title of the current result can be recorded 1112. This includes not only the locations of the various query terms that appear in the title, but also the location of any other term (or character or string) that was recognized from the image. A new "order" score can then be determined 1114 for the search result based at least in part upon the order of the identified words in the title. For example, if the original search string was A, B, C, D, then a result with A, C, D would have a higher relevancy score than A, D, C. Such a result helps to reduce false positives by lowering the relevancy of results where some of the words may appear, but in orders different than were present in the query image.

In addition to determining an order score for the current search result, the result can be analyzed to attempt to determine the presence of a model number, product identifier, item code, or other such string. As mentioned, uncommon words such as model numbers can help to very accurately identify a particular product or item associated with those uncommon words. While many products might include a word such as "liquid," a very limited set of products might have associated strings such as "D234AS-3." While such information can be highly indicative of the correct match, the uncommonness of these words can prevent them from being accurately identified by the OCR engine in some cases or situations, such that it can be desirable to still utilize other information discussed and suggested herein. In this example, the text can be analyzed to attempt to determine whether any of the words match a known model number or product identifier. If so, those words can be given a substantial up-weighting in the relevancy determination. Similarly, the text can be analyzed to attempt to determine whether any of the words match patterns for model numbers or identifiers, even if those numbers or identifiers may not be include in the relevant dictionary. This helps to improve accuracy by increasing the scope of potential model numbers and identifiers that may not be in a fixed dictionary, as introducing a pattern-based model number identification algorithm can help to recover additional model numbers missed by the creators or maintainers of the dictionary. Various patterns can be used for recognition, as may include strings of a range of lengths that may include numbers or specific characters, as well as capital letters or other such inclusions. Various patterns can be generated for matching, whereby strings with certain locations of numbers or letters are more likely identified as model numbers. Further, certain brands might use certain model number patterns, and if a brand name is identified then the associated model number patterns can be given more weight in attempting to locate model numbers from the text. A model score can then be updated 1116 based at least in part upon any model number being identified in the text. In some cases each word can have a multiplier of 1 if not a model number and a multiplier of greater than 1 (e.g., 5) if determined to be a model number. In some embodiments the multiplier might be greater (e.g., 5) for a known model number than (e.g., 2) for a string that was not recognized but matches the pattern of a model number. A total relevancy score for the search term can then be generated 1118 based at least in part upon the relevancy score from the search engine, the order score, and the model score. This can be the result of an additive function, such as may be given by:

total relevancy=search relevancy+order score+match score or total relevancy=search relevancy*order score*match score or total relevancy=search relevancy*(order score+match score)

among other such options. In at least some embodiments a machine learning algorithm can be used that can monitor user interaction with the search results after the new scores are determined, as well as user actions after obtaining these results. The machine learning algorithm can then learn, over time, which of the above functions (or other related functions) provides the most accurate results and can use that function going forward. Additional monitoring can occur such that the formulas can be updated over time as appropriate. If there are determined 1120 to be additional search results to be analyzed, the process can continue with total relevancy scores being generated for those results as well.

Once the total relevancy scores are generated, the scores can be normalized 1122 for more accurate comparison and/or ranking. The normalization can occur after each score is determined or after all the scores are generated, among other such options. In one embodiment, a total relevancy score can be normalized using a formula such as:

$$\text{Normalized\_Score} = \frac{\text{total\_score} * \text{matched\_word\_count}}{\text{total\_word\_count}}$$

Once the scores are normalized, they can be ranked 1124 by normalized score. Information for the result having at least the highest ranked score can be returned 1126 as a potential match. In some embodiments, information for a set of highest ranked results can be returned. In some embodiments, a result must have at least a minimum relevancy score (normalized or otherwise) before being returned as a potential match. If none of the results at least meet the minimum threshold, then a result of "no matches found" or a similar message can be returned.

Figure 12A:
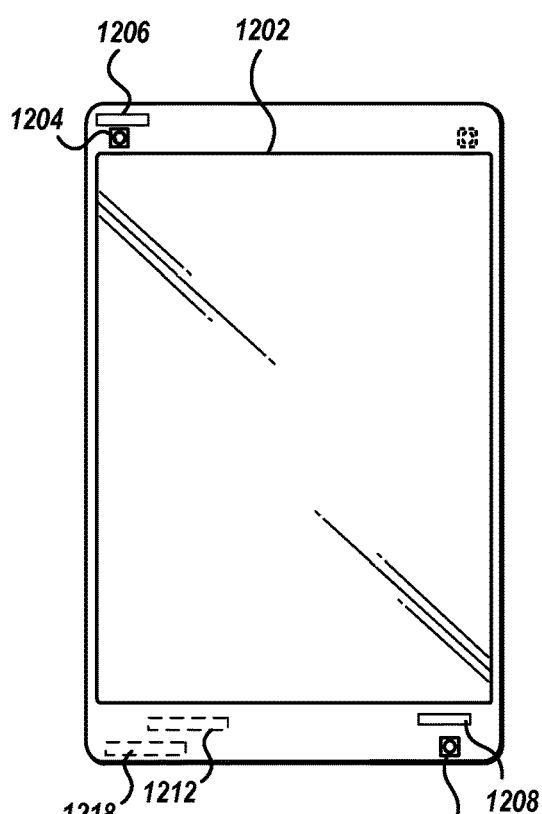
FIGS. 12A and 12B illustrate an example computing device that can be used to implement aspects of various embodiments.
Figure 12B:
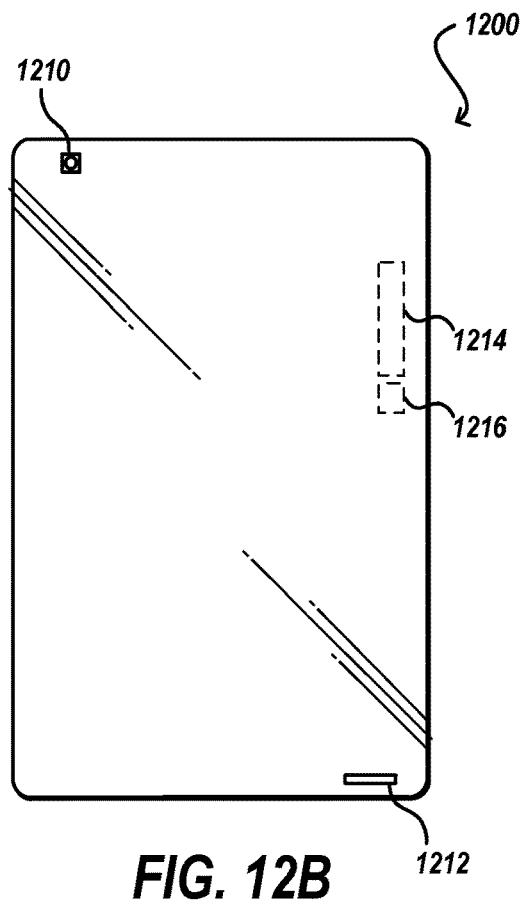

FIGS. 12A and 12B illustrate front and back views, respectively, of an example electronic computing device 1200 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1200 has a display screen 1202 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1204 on the front of the device and at least one image capture element 1210 on the back of the device. It should be understood, however, that image capture elements could also, or alternatively, be placed on the sides or corners of the device, and that there can be any appropriate number of capture elements of similar or different types. Each image capture element 1204 and 1210 may be, for example, a camera, a charge-coupled device (CCD), a motion detection sensor or an infrared sensor, or other image capturing technology.

As discussed, the device can use the images (e.g., still or video) captured from the imaging elements 1204 and 1210 to generate a three-dimensional simulation of the surrounding environment (e.g., a virtual reality of the surrounding environment for display on the display element of the device). Further, the device can utilize outputs from at least one of the image capture elements 1204 and 1210 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1208 on the front side, one microphone 1212 on the back, and one microphone 1206 on or near a top or side of the device. In some devices there may be only one microphone, while in other devices there might be at least one microphone on each side and/or corner of the device, or in other appropriate locations.

The device 1200 in this example also includes one or more orientation- or position-determining elements 1218 operable to provide information such as a position, direction, motion, or orientation of the device. These elements can include, for example, accelerometers, inertial sensors, electronic gyroscopes, and electronic compasses.

The example device also includes at least one communication mechanism 1214, such as may include at least one wired or wireless component operable to communicate with one or more electronic devices. The device also includes a power system 1216, such as may include a battery operable to be recharged through conventional plug-in approaches, or through other approaches such as capacitive charging through proximity with a power mat or other such device. Various other elements and/or combinations are possible as well within the scope of various embodiments.

Figure 13:
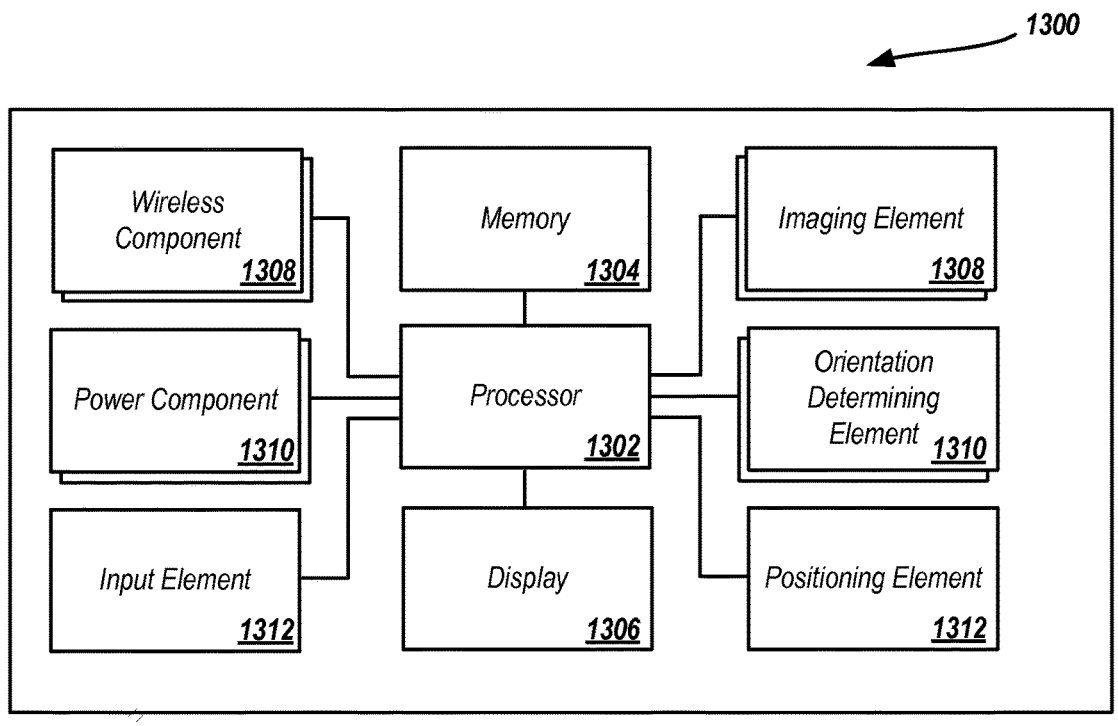
FIG. 13 illustrates example components that can be used with a device such as that illustrated in FIGS. 12A and 12B.

FIG. 13 illustrates a set of basic components of an electronic computing device 1300 such as the device 1200 described with respect to FIG. 12. In this example, the device includes at least one processing unit 1302 for executing instructions that can be stored in a memory device or element 1304. As would be apparent to one of ordinary skill in the art, the device can include many types of memory, data storage, or computer-readable media, such as a first data storage for program instructions for execution by the processing unit(s) 1302, the same or separate storage can be used for images or data, a removable memory can be available for sharing information with other devices, and any number of communication approaches can be available for sharing with other devices.

The device typically will include some type of display element 1306, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1308, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1300 also includes at least one orientation determining element 1310 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1300. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1312 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1314 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1316, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1318 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 14:
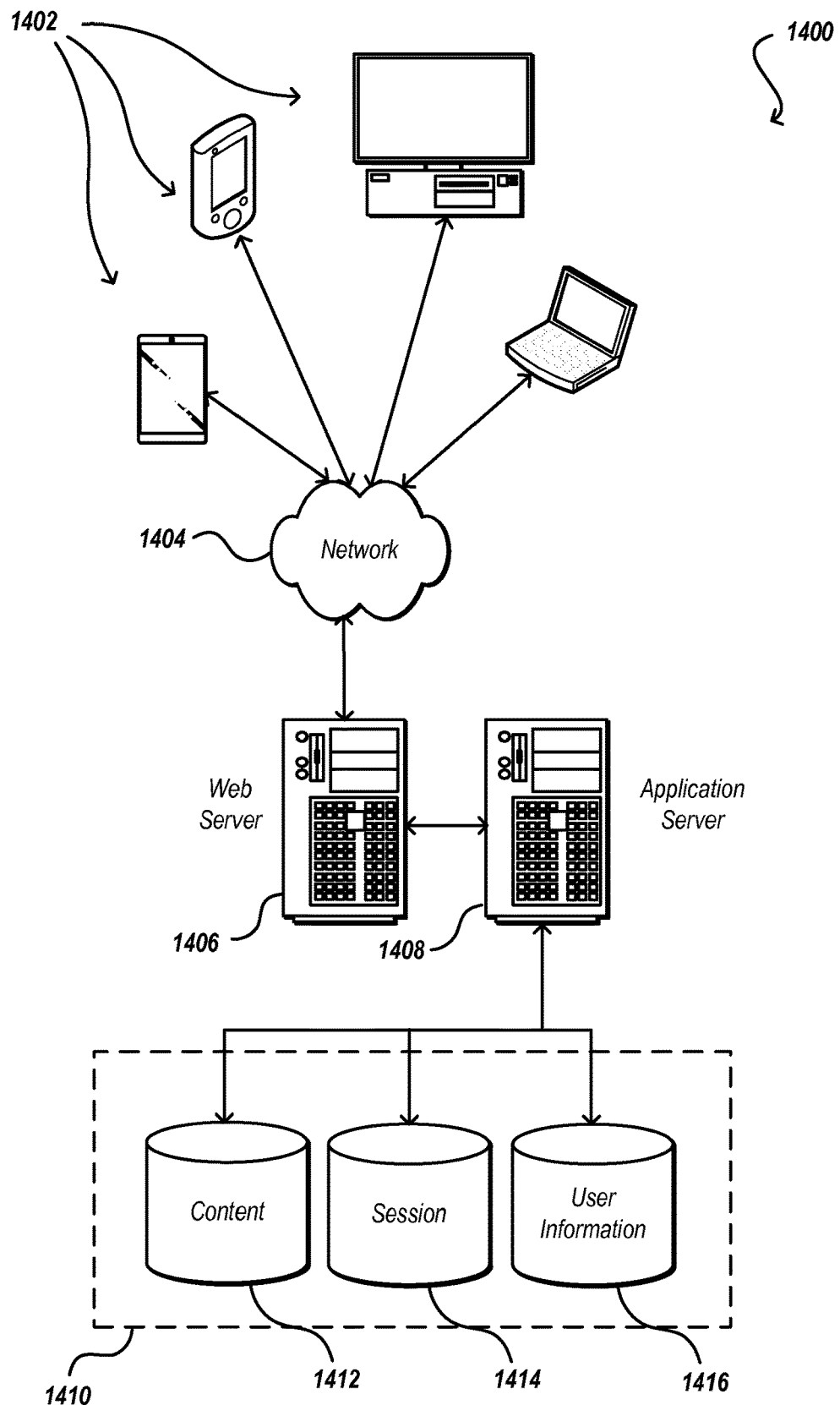
FIG. 14 illustrates an environment in which various embodiments can be implemented.

As discussed, different approaches can be implemented in various environments in accordance with the described embodiments. For example, FIG. 14 illustrates an example of an environment 1400 for implementing aspects in accordance with various embodiments. As will be appreciated, although a Web-based environment is used for purposes of explanation, different environments may be used, as appropriate, to implement various embodiments. The system includes an electronic client device 1402, which can include any appropriate device operable to send and receive requests, messages or information over an appropriate network 1404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1406 for receiving requests and serving content in response thereto, although for other networks, an alternative device serving a similar purpose could be used, as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1406 in the form of HTML, XML or another appropriate structured language in this example. The handling of all requests and responses, as well as the delivery of content between the client device 1402 and the application server 1408, can be handled by the Web server 1406. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing content (e.g., production data) 1412 and user information 1416, which can be used to serve content for the production side. The data store is also shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate non-transitory storage media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor, and
   memory including instructions that, when executed by at least one processor, cause the system to:
      obtain at least one image frame containing text captured using a camera of a computing device;
      cause text within the at least one image frame to be recognized with an optical character recognition (OCR) engine;
      obtain a set of recognized text strings and corresponding confidence scores that the text strings have been correctly recognized;
      determine, for each text string of the set of recognized text strings, a respective text string score based at least in part on the corresponding confidence score, a font size of the text string, and a distance of the text string from the center of the image frame;
      select one or more of the set of recognized text strings based at least in part on the respective text string score;
      submit the selected one or more of the set of recognized text strings to a search engine associated with an electronic marketplace;
      receive, from the search engine, a set of search results, each search result including a title of an associated product and a respective relevance score;
      compare the set of search results against the set of recognized text strings to generate respective total relevance scores by:
         comparing respective search results against all text strings of the set of recognized text strings for the image, including an ordering of the set of recognized text strings in the at least one image frame, to generate an ordered relevance score;
         determining an increased weighting of any recognized text string that is determined to correspond to a model number for an associated product; and
         generating respective total relevance scores for the search result based at least in part upon the respective relevance score, the ordered relevance score, and the increased weighting;
      normalize the respective total relevance scores for the set of search results;
      determine a ranking of at least a subset of the set of search results based on the respective normalized total relevance scores; and
      provide information for at least a highest ranked search result as a matching result for the text object.

2. The system of claim 1, wherein the instructions, when executed, further cause the system to:
   determine that one of the recognized text strings corresponds to a model number by at least one of locating the recognized text string in a product database or determining that the recognized text string matches a pattern of a model number; and
   adjust the text string score of the recognized text string.

3. The system of claim 1, wherein the instructions, when executed, further cause the system to:
   determine the ordered relevance score for a search result based at least in part upon how closely an ordering of a subset of the recognized text strings corresponds to an ordering of corresponding text strings in the search result.

4. The system of claim 1, wherein the instructions, when executed, further cause the system to:
   obtain the information for the highest ranked search result from a product database including information for a product corresponding to the highest ranked search result.

5. A computer-implemented method, comprising:
   under the control of one or more computer systems configured with executable instructions,
   receiving a set of recognized text strings from a character recognition engine, the set generated based on a query image containing a representation of at least one text object;
   obtaining, for each recognized text string of the set of recognized text strings, a confidence score that a text string has been correctly recognized;
   determining a text string score of each of the set of recognized text strings, each text string score based at least in part on the respective confidence score of the text string, a font size of the text string, and a distance of the text string from the center of the image frame;
   selecting a subset of the set of recognized text strings based at least in part on the respective text string scores;
   processing the subset of the set of recognized text strings using a search engine to obtain a set of search results, each search result having a respective relevance score produced by the search engine;
   comparing at least a subset of the search results against the set of recognized text strings, including an ordering of the recognized text strings from the query image, to generate a new respective relevance score for a respective search result; and
   providing information for at least a search result having a highest new respective relevance score as a match for the at least one text object represented in the query image.

6. The computer-implemented method of claim 5, further comprising:

determining that a specified text string of the set of recognized text strings corresponds to at least one of a model number or an object identifier; and increasing a weighting of the specified text string, the new respective relevance score for a specified search result containing the specified text string being further determined at least in part on the increased weighting of the specified text string contained within the specified search result.

7. The computer-implemented method of claim 6, wherein determining that the specified text string corresponds to at least one of a model number or an object identifier includes at least one of locating the specified text string in a product database or determining that the specified text string matches a pattern of a model number.

8. The computer-implemented method of claim 5, further comprising:

determining a title of a search result from a product database, wherein the set of recognized text strings is compared against the title in generating the new respective relevance score for the search result.

9. The computer-implemented method of claim 5, further comprising:

obtaining the information for the search result having the highest new respective relevance score from a product database including information for a product corresponding to the search result.

10. The computer-implemented method of claim 5, further comprising:

obtaining the query image as captured using a camera of a computing device.

11. The computer-implemented method of claim 5, further comprising:

pre-processing the query image to improve at least one quality parameter of the query image before providing the query image to the character recognition engine.

12. The computer-implemented method of claim 5, wherein the query image includes at least one of a single, digital still image or a frame of video content.

13. The computer-implemented method of claim 5, wherein the set of recognized text strings includes at least one of words, characters, or alphanumeric strings.

14. The computer-implemented method of claim 5, further comprising:

determining that a specified text string of the set of recognized text strings comprises a stop word, and wherein the text string score of the specified text string is based at least in part on the determination.

15. The computer-implemented method of claim 5, further comprising:

analyzing, using a machine learning algorithm, accuracy information for each formula, of a set of formulas, for determining which formula provides new respective relevance scores with a highest level of accuracy; and using the formula providing the highest level of accuracy, as determined by the machine learning algorithm, to generate new respective relevance scores for subsequent search results.

16. A non-transitory computer-readable storage medium including instructions that, when executed by at least one processor of a computer system, cause the computer system to:

receive a set of recognized text strings from a character recognition engine, the set generated based on a query image containing a representation of at least one text object;

obtain, for each recognized text string of the set of recognized text strings, a confidence score that a text string has been correctly recognized;

determine a text string score of each of the set of recognized text strings, each text string score based at least in part on the respective confidence score of the text string, a font size of the text string, and a distance of the text string from the center of the image frame;

select a subset of the set of recognized text strings based at least in part on the respective text string scores;

process the subset of the set of recognized text strings using a search engine to obtain a set of search results, each search result having a respective relevance score produced by the search engine;

compare at least a subset of the search results against the set of recognized text strings, including an ordering of the recognized text strings from the query image, to generate a new respective relevance score for a respective search result; and provide information for at least a search result having a highest new respective relevance score as a match for the at least one text object represented in the query image.

17. The non-transitory computer-readable storage medium of claim 16, wherein the instructions when executed further cause the computer system to:

determine that a specified text string of the set of recognized text strings corresponds to at least one of a model number or an object identifier; and increase a weighting of the specified text string, the new respective relevance score for a specified search result containing the recognized text string being further determined at least in part on the increased weighting.

18. The non-transitory computer-readable storage medium of claim 17, wherein determining that the specified text string corresponds to at least one of a model number or an object identifier includes at least one of locating the specified text string in a product database or determining that the specified text string matches a pattern of a model number.

19. The non-transitory computer-readable storage medium of claim 16, wherein the instructions when executed further cause the computer system to:

obtain the information for the search result having the highest new respective relevance score from a product database including information for a product corresponding to the search result.

20. The non-transitory computer-readable storage medium of claim 16, wherein the instructions when executed further cause the computer system to:

obtain the query image as captured using a camera of a computing device; and pre-process the query image to improve at least one quality parameter of the query image before providing the query image to the character recognition engine.

* * * * *